Figure 1:
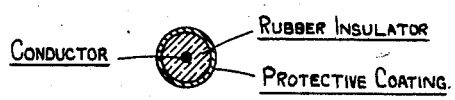

Oct. 23, 1934.   W. H. MOSS   1,977,643
PROTECTIVE COVERING
Filed Aug. 19, 1931

Inventor
William Henry Moss
by
J. Seltzer and bllfurnison
Attorneys

Patented Oct. 23, 1934

1,977,643

UNITED STATES PATENT OFFICE 1,977,643

PROTECTIVE COVERING

William Henry Moss, London, England, assignor to Celanese Corporation of America, a corporation of Delaware Application August 19, 1931, Serial No. 557,993
In Great Britain August 28, 1930

23 Claims. (Cl. 91—68)

This invention relates to protective coverings and more particularly to coverings for protecting rubber and other electrical insulating and sheathing materials from agencies having a deleterious action upon them.

In the production of flexible materials, particularly materials made of or containing rubber, a number of factors affecting the durability of the materials have to be considered. These factors are of especial importance in the production of cables and other electrical apparatus, where owing to the application of high voltage high electric stress may be produced in the surrounding atmosphere with resultant production of ozone at the surface of the rubber or other insulating or sheathing material. The ozone has a highly destructive action upon rubber or similar materials and tends to destroy the resilience thereof. Ultra-violet light also has a deleterious action on rubber in the course of time and rubber dielectric or sheathing used in connection with mercury vapour lamps and other apparatus for the production of ultra-violet light is liable to deterioration through the action of the ultra-violet light. Air itself, especially in the presence of sunlight, will cause ageing of rubber and a loss of flexibility and strength. The destructive action of these agencies on the insulating or sheathing material may be considerably enhanced by the temperatures, often above atmospheric, at which insulated conductors are worked, thus causing rapid deterioration of the insulating material.

The invention is particularly concerned with providing for cables and other electrical apparatus a protective covering against the above and other destructive agencies. The invention is of the greatest value in connection with the protection of cables insulated or sheathed with rubber or with compositions containing a relatively high proportion of rubber, and will be described hereinafter with reference to this particular application, though it is to be understood that the scope of the invention is not limited thereto.

To be suitable for the above purposes a protective material must conform with requirements which are very stringent indeed. Thus it is of the utmost importance that the protective material should be flexible, that it should not lose its flexibility with the passage of time and that it should retain its flexibility even when exposed for long periods to temperatures approaching 100° C. The terms "flexible" and "flexibility" are employed in this specification to indicate that property which enables the protective coating to bend through very considerable angles with the rubber insulated cable to which it is applied, and in general to conform with any configuration which may be imposed upon the cable without developing cracks or without otherwise permitting access of the surrounding atmosphere to the rubber. In addition the protective coating should be continuous, i. e. not porous, and should not develop porosity due to ageing or bending. Further the protective material should possess resistance to oils or other substances which may come into contact with the cable. These desiderata render the finding of a suitable protective material one of the utmost difficulty.

The simple application of organic cellulose derivatives as a protective coating has the disadvantage that the films formed from coating compositions containing these compounds tend to become brittle and to crack or to flake from the material which they were intended to protect. The incorporation of relatively low proportions of plasticizers in the films improves to some extent their suppleness but the films even then do not approach the flexibility desired for many purposes. I have found that in order to attain a very high degree of flexibility it is necessary to incorporate in the coatings high proportions of plasticizer, for example proportions of over 100%, and especially proportions of 150 to 200 to 250%, based on the cellulose derivative.

The great majority of plasticizers are not sufficiently compatible with organic derivatives of cellulose to be employed in large proportions since they bloom out, either immediately or in time. The protective covering would therefore rapidly lose its flexibility and would become brittle. Other plasticizers on the other hand are too volatile and a protective covering containing them would lose its flexibility, and would tend to flake off electrical insulating material to which it had been applied. Furthermore, large proportions of many plasticizers cause the composition to remain sticky and are therefore quite unsuitable. These deficiencies offered an apparently insuperable barrier to the employment of sufficient plasticizer in an organic cellulose derivative composition to render the composition sufficiently flexible for the particular purpose in view, and capable of retaining its flexibility even after a long time and continued exposure to raised temperature and at the same time affording protection against agencies destructive to the insulating or sheathing materials.

Certain compositions have now been found which satisfy the conditions enumerated above when employed as protective coverings. These compositions contain organic derivatives of cellulose and more than 100%, based on the cellulose derivative, of certain plasticizers. These plasticizers are aromatic sulphonamides, particularly the N-alkyl substituted sulphonamides, such as xylene monomethyl sulphonamide, and the tartrate plasticizers, more particularly dibutyl tartrate and amyl tartrate. Coatings or impregnated tapes or the like produced from coating compositions containing such high proportions of these plasticizers based on the cellulose derivative are highly flexible and remain so for a long period, and in addition offer a great resistance to oxidizing agencies or other destructive influences, such as ozone or ultra-violet light.

According to the present invention, therefore, rubber and other electrical insulating and sheathing materials are protected by means of compositions containing organic derivatives of cellulose and more than 100 parts, based on the cellulose derivative, of aromatic sulphonamide or tartrate plasticizers.

The compositions may be applied to the insulated conductors, and particularly cables insulated or sheathed with rubber, in a variety of ways. Thus they may be used directly as coatings for the insulating or sheathing material. For example a rubber insulated or sheathed cable may be passed directly through a bath containing the molten or dissolved composition and any excess composition removed if desired or requisite by suitable means, such for example as by passing the insulated cable through a die. Again, the compositions may be dissolved in a solvent and applied by brushing or spraying. In applying the compositions, and particularly relatively liquid compositions such as those containing volatile solvents, it is advisable to apply a number of relatively thin coatings and to dry each coating before the application of the next coating. A further method consists in passing the cable or insulated conductor through an annular stream of the composition which is thus applied in a continuous manner. Again, the composition may be moulded on to the cable or insulated conductor, or extruded around it.

Not only may the composition be applied directly to a cable or insulated conductor as above described, but it may be applied to tapes, ribbons, or films previously or subsequently to be wound around the insulating material or sheath, or to a fabric with which the insulating material or sheath is previously or subsequently covered. These tapes, films, fabrics and the like may be of any suitable material, e. g. silk, cotton, or regenerated cellulose, and may be woven, knitted, or netted, and the tape may be of the so-called bias type. Furthermore, I have found that high flexibility may be obtained while using a foundation material by employing for example a warp of threads, say thousands of threads aligned side by side, or a relatively limited number of threads close together, and doping the same with the composition so that on drying they adhere to each other and form a fabric or tape. If desired, such a warp or such a collection of individual threads may be held together at more or less long intervals by suitable wefts.

The composition may be applied to a film, fabric, or tape by any suitable method, for example by spraying a solution on to the material so as to fill completely the interstices between the component threads of the materials, or by any other suitable means, for example those described for the application of a composition to the insulated conductor itself. The layers of impregnated material may if desired be caused to adhere to each other when wound round the insulated conductor. Thus for example a cable wound with the impregnated material, e. g. tapes, may be subjected to the action of heat so as to soften the composition and cause the layers of impregnated material to stick together. If desired such heating may take place simultaneously with vulcanization of the rubber or like insulating material or sheath, and for this purpose it is often convenient, as in the known art, to cover the insulated cable wound with the impregnated material with a lead sheath, to subject it to the action of heat while enclosed in the lead sheath, and finally to remove the lead sheath. As a further alternative solvents or softening agents may be applied in liquid or vapour form to cause or to assist the adherence of the individual layers of impregnated tapes or the like.

The cellulose derivative employed in the protective composition may be cellulose acetate, formate, propionate, or butyrate, or higher members of this series, or other organic esters of cellulose including cellulose nitro-acetate, especially cellulose nitro-acetate of low nitrogen content, or it may be a cellulose ether, for example ethyl, methyl, or benzyl cellulose.

Natural, semisynthetic, or synthetic resins may also be included in the composition and may improve its strength, and, especially where the composition is to be used directly for coating purposes, may increase its adhesive properties. Synthetic resins may also have a beneficial action on the compatibility of the plasticizer and cellulose derivative in the composition, and may enable increased quantities of plasticizer to be used without danger of the plasticizer blooming out. Among synthetic resins suitable for use in accordance with this invention are those obtainable by the condensation of phenols and aldehydes or ketones, e. g. phenol formaldehyde and phenol furfural resins, and particularly condensation products of the complex phenols such as diphenylol propane, for example diphenylol propane-formaldehyde resins, diphenylol propane-acetone resins, diphenylol propane-furfural resins. Amongst other resins suitable for use in accordance with the present invention may be mentioned furfural-ketone resins, furfural-amine resins, resins obtainable by the condensation of aldehydic or ketonic substances with aromatic amino or aryl sulphonamide or N-amino substituted aryl sulphonamide compounds, resins derived from the condensation of ureas or thioureas with aldehydic substances with or without phenolic bodies, lactic acid resins, sulphurized phenol resins, resins obtainable by the polymerization of aldehydes or vinyl compounds, and resins obtainable by the condensation of aldehydes or ketones with mercaptans or thiophenols. In general when synthetic resins are present in the composition it is preferred to use up to about 30% to 40% of synthetic resin based on the weight of cellulose derivative present, but higher percentages may in some cases be used.

The composition may be plasticized by one or more of the plasticizers of the invention. In the case where a mixture of sulphonamide and tartrate is employed the proportion of mixed plasticizer in the composition should be more than 100% of the cellulose derivative employed. Furthermore a proportion of some other plasticizer may be added in addition to the particular plasticizers of the present invention. It is important however that the quantities of these additional plasticizers should not be so great as to introduce the disadvantages enumerated at the beginning of the specification. Examples of other plasticizers which may be employed in addition to those of the present invention are triphenyl phosphate, tricresyl phosphate, diphenylol propane, triacetin and diethyl phthalate. Pigments or dyes may also be employed in order to produce coloured effects.

Solvents whether low or high boiling may or may not be incorporated in the compositions of the present invention. When the compositions are applied in solution form to tapes and the like they are preferably applied in solution in a volatile solvent, which may however contain in addition higher boiling solvents. Among volatile solvents acetone, methyl acetate, alcohol, benzene, methyl ethyl ketone, ethylene dichloride or mixtures of these may be employed. Examples of higher boiling solvents are the methyl ether of ethylene glycol, dioxane, and ethyl lactate.

Reference is had to the accompanying drawing which shows diagrammatically some modes of carrying out my invention, wherein Figure 1 shows a cross section of a simple rubber insulated cable coated with the composition of this invention.

Figure 2:
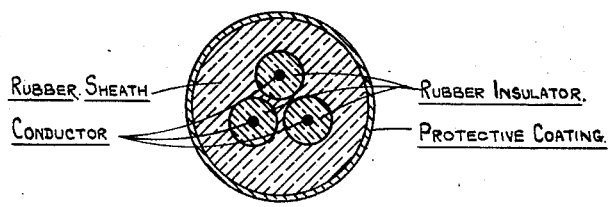
Figure 3:
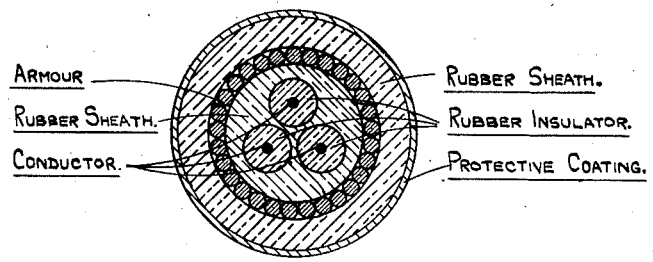

Figure 2 shows a cross section of rubber insulated conductors sheathed with rubber covered with the protective coating of this invention, and Figure 3 shows a cross section of a rubber insulated and armoured and rubber sheathed cable coated with the protective composition.

The following are examples of solutions which may be applied directly to cables insulated or sheathed with rubber or to tapes or the like for winding round the cables, but it should be understood that they are given by way of illustration only and are in no way limitative, and in particular that the quantities of volatile solvents indicated therein may be varied within wide limits.

| Example 1 | Parts |
|---|---|
| Cellulose acetate | 100 |
| Dibutyl tartrate | 150 |
| Triphenyl phosphate | 15 |
| Acetone | 500 |
| Methyl acetone | 500 |

| Example 2 | Parts |
|---|---|
| Cellulose acetate | 100 |
| Dibutyl tartrate | 200 |
| Tricresyl phosphate | 20 |
| Acetone | 500 |
| Alcohol | 250 |
| Benzene | 250 |
| Carbon black | 10 |

| Example 3 | Parts |
|---|---|
| Cellulose acetate | 100 |
| Xylene monomethyl sulphonamides | 150 |
| Diphenylol propane | 50 |
| Acetone | 400 |
| Methyl acetate | 250 |
| Methyl ethyl ketone | 200 |
| Diacetone alcohol | 50 |

| Example 4 | Parts |
|---|---|
| Cellulose propionate | 100 |
| Amyl tartrate | 180 |
| Acetone | 800 |

| Example 5 | Parts |
|---|---|
| Cellulose acetate | 100 |
| Synthetic resin e. g. diphenylol propane-formaldehyde resin | 30 |
| Xylene monomethyl sulphonamides | 150 |
| Tricresyl phosphate | 20 |
| Ethylene dichloride | 300 |
| Alcohol | 300 |
| Acetone | 400 |

| Example 6 | Parts |
|---|---|
| Cellulose acetate | 100 |
| Synthetic resin as in Example 5 | 35 |
| Dibutyl tartrate | 200 |
| Tricresyl phosphate | 20 |
| Acetone | 500 |
| Dioxane | 100 |
| Methyl ether of ethylene glycol | 50 |
| Ethyl lactate | 20 |

What I claim and desire to secure by Letters Patent is:—

1. Process for the protection of electrical insulating materials comprising coating the materials with a composition containing an organic derivative of cellulose and more than 150 parts of plasticizer selected from the group consisting of the aromatic sulphonamides and their derivatives and the tartrate esters per 100 parts of cellulose derivative.

2. Process for the protection of materials at least the surfaces of which contain rubber comprising coating the materials with a composition containing an organic derivative of cellulose and from 170 to 220 parts of plasticizer selected from the group consisting of the aromatic sulphonamides and their derivatives and the tartrate esters per 100 parts of cellulose derivatives.

3. Process for the protection of electrical insulating materials comprising coating the materials with a composition containing cellulose acetate and more than 150 parts of plasticizer selected from the group consisting of the aromatic suphonamides and their derivatives and the tartrate esters per 100 parts of cellulose acetate.

4. Process of the protection of materials at least the surfaces of which contain rubber comprising coating the materials with a composition containing cellulose acetate and from 170 to 220 parts of plasticizer selected from the group consisting of the aromatic sulphonamides and their derivatives and the tartrate esters per 100 parts of cellulose acetate.

5. Process for the protection of electrical insulating materials comprising coating the materials with a composition containing an organic derivative of cellulose and more than 150 parts of plasticizer selected from the group consisting of xylene monomethyl sulphonamide, dibutyl tartrate and amyl tartrate per 100 parts of cellulose derivative.

6. Process for the protection of materials at least the surfaces of which contain rubber comprising coating the materials with a composition containing an organic derivative of cellulose and from 170 to 220 parts of plasticizer selected from the group consisting of xylene monomethyl sulphonamide, dibutyl tartrate and amyl tartrate per 100 parts of cellulose derivative.

7. Process for the protection of electrical insulating materials comprising coating the materials with a composition containing cellulose acetate and more than 150 parts of plasticizer selected from the group consisting of xylene monomethyl sulphonamide, dibutyl tartrate and amyl tartrate per 100 parts of cellulose acetate.

8. Process for the protection of electric cables comprising a layer containing rubber which comprises coating the layer with a composition containing cellulose acetate and from 170 to 220 parts of plasticizer selected from the group consisting of xylene monomethyl sulphonamide, dibutyl tartrate and amyl tartrate per 100 parts of cellulose acetate.

9. Process for the protection of electrical insulating materials comprising the operations of coating foundation material with a composition containing an organic derivative of cellulose and more than 150 parts of plasticizer selected from the group consisting of the aromatic sulphonamides and their derivatives and the tartrate esters per 100 parts of cellulose derivative, and applying said foundation material to the insulating materials.

10. Process for the protection of electrical insulating materials comprising coating the materials with a composition containing an organic derivative of cellulose and more than 150 parts of plasticizer selected from the group consisting of the aromatic sulphonamides and their derivatives and the tartrate esters per 100 parts of cellulose derivative, and containing in addition another plasticizer.

11. Process for the protection of electrical insulating materials comprising coating the materials with a composition containing an organic derivative of cellulose and more than 150 parts of plasticizer selected from the group consisting of the aromatic sulphonamides and their derivatives and the tartrate esters per 100 parts of cellulose derivative, and containing in addition a resin.

12. Materials at least the surfaces of which comprise rubber which are protected by means of a composition containing an organic derivative of cellulose and more than 150 parts of plasticizer selected from the group consisting of the aromatic sulphonamides and their derivatives and the tartrate esters per 100 parts of cellulose derivative.

13. Materials at least the surfaces of which comprise rubber, which are protected by means of a composition containing an organic derivative of cellulose and from 170 to 220 parts of plasticizer selected from the group consisting of the aromatic sulphonamides and their derivatives and the tartrate esters per 100 parts of cellulose derivative.

14. Electrical materials the insulation or sheathing of which is protected by means of a composition containing an organic derivative of cellulose and more than 150 parts of plasticizer selected from the group consisting of xylene monomethyl sulphonamide, dibutyl tartrate and amyl tartrate per 100 parts of cellulose derivative.

15. Materials at least the surfaces of which comprise rubber, which are protected by means of a composition containing an organic derivative of cellulose and from 170 to 220 parts of plasticizer selected from the group consisting of xylene monomethyl sulphonamide, dibutyl tartrate and amyl tartrate per 100 parts of cellulose derivative.

16. Electrical materials the insulation or sheathing of which is protected by means of a composition containing cellulose acetate and more than 150 parts of plasticizer selected from the group consisting of the aromatic sulphonamides and their derivatives and the tartrate esters per 100 parts of cellulose acetate.

17. Materials at least the surfaces of which comprise rubber, which are protected by means of a composition containing cellulose acetate and from 170 to 220 parts of plasticizer selected from the group consisting of the aromatic sulphonamides and their derivatives and the tartrate esters per 100 parts of cellulose acetate.

18. Electrical materials the insulation or sheathing of which is protected by means of a composition containing cellulose acetate and more than 150 parts of plasticizer selected from the group consisting of xylene monomethyl sulphonamide, dibutyl tartrate and amyl tartrate per 100 parts of cellulose acetate.

19. Materials at least the surfaces of which comprise rubber, which are protected by means of a composition containing cellulose acetate and from 170 to 220 parts of plasticizer selected from the group consisting of xylene monomethyl sulphonamide, dibutyl tartrate and amyl tartrate per 100 parts of cellulose acetate.

20. Electrical materials the insulation or sheathing of which is protected by means of a composition containing benzyl cellulose and more than 150 parts of plasticizer selected from the group consisting of the aromatic sulphonamides and their derivatives and the tartrate esters per 100 parts of benzyl cellulose.

21. Cables comprising a sheath containing rubber which is protected by a composition containing an organic derivative of cellulose and more than 150% based on the celllulose derivative of plasticizer selected from the group consisting of the aromatic sulphonamides and their derivatives and the tartrate esters.

22. Cables comprising a sheathing containing rubber which is protected by a composition comprising cellulose acetate and more than 150% based on the cellulose acetate of plasticizer selected from the group consisting of xylene monomethyl sulphonamide, dibutyl tartrate and amyl tartrate.

23. Cables comprising a sheathing containing rubber which is protected by a composition comprising cellulose acetate and from 170 to 220% based on the cellulose acetate of plasticizer selected from the group consisting of xylene monomethyl sulphonamide, dibutyl tartrate and amyl tartrate.

WILLIAM HENRY MOSS.